(12) United States Patent
Hu et al.

(10) Patent No.: US 11,044,766 B2
(45) Date of Patent: Jun. 22, 2021

(54) METHOD FOR WI-FI CONNECTION AND RELATED PRODUCTS

(71) Applicant: Guangdong Oppo Mobile Telecommunications Corp., Ltd., Guangdong (CN)

(72) Inventors: Yadong Hu, Guangdong (CN); Yi Yu, Guangdong (CN); Shimin Jiang, Guangdong (CN); Botao Cu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 135 days.

(21) Appl. No.: 16/538,385

(22) Filed: Aug. 12, 2019

(65) Prior Publication Data

US 2019/0364610 A1    Nov. 28, 2019

Related U.S. Application Data

(63) Continuation of application No. PCT/CN2017/103173, filed on Sep. 25, 2017.

(30) Foreign Application Priority Data

Feb. 20, 2017    (CN) .......................... 201710090718.8

(51) Int. Cl.
*H04W 76/10*    (2018.01)
*H04W 48/16*    (2009.01)
(Continued)

(52) U.S. Cl.
CPC ........... *H04W 76/10* (2018.02); *H04W 48/16* (2013.01); *H04W 48/20* (2013.01); *H04W 84/12* (2013.01)

(58) Field of Classification Search
CPC ..... H04W 76/10; H04W 48/16; H04W 48/20; H04W 84/12; H04W 48/14
See application file for complete search history.

(56) References Cited

U.S. PATENT DOCUMENTS

2004/0110530 A1* 6/2004 Alone ..................... H04L 63/10
455/552.1
2008/0130595 A1* 6/2008 Abdel-Kader ........ H04W 48/16
370/338
(Continued)

FOREIGN PATENT DOCUMENTS

CN          1485751 A       3/2004
CN        101848528 A       9/2010
(Continued)

OTHER PUBLICATIONS

English Translation The first office action issued in corresponding CN application No. 201710090718.8 dated May 20, 2019.
(Continued)

*Primary Examiner* — Hoang-Chuong Q Vu (57) ABSTRACT

A method for Wi-Fi connection and related products are provided. The method includes the following. Wi-Fi scan is performed to obtain information of K APs, where K is a positive integer. Match the information of the K APs with information of P first APs in a first Wi-Fi list pre-stored, where the first Wi-Fi list contains the P first APs and Q second APs each marked as a hidden AP, and P and Q are both positive integers. The Q second APs are determined as candidate APs for roaming in response to a match between the information of the K APs and the information of the P first APs in the first Wi-Fi list.

20 Claims, 6 Drawing Sheets

(51) Int. Cl.
*H04W 48/20* (2009.01)
*H04W 84/12* (2009.01)

(56) References Cited

U.S. PATENT DOCUMENTS

| | | | | |
|---|---|---|---|---|
| 2010/0309815 | A1* | 12/2010 | Yepez | H04L 12/4625 370/254 |
| 2014/0064140 | A1* | 3/2014 | Chhabra | H04W 84/18 370/254 |
| 2014/0128102 | A1* | 5/2014 | Finlow-Bates | H04W 4/029 455/456.3 |
| 2014/0223235 | A1 | 8/2014 | Gundlapalli et al. | |
| 2017/0339628 | A1* | 11/2017 | Chen | H04W 8/02 |

FOREIGN PATENT DOCUMENTS

| | | |
|---|---|---|
| CN | 104105169 A | 10/2014 |
| CN | 104782187 A | 7/2015 |
| CN | 104936181 A | 9/2015 |
| CN | 106255106 A | 12/2016 |
| CN | 106488529 A | 3/2017 |
| CN | 106888496 A | 6/2017 |
| WO | 2014071170 A1 | 5/2014 |
| WO | 2016180210 A1 | 11/2016 |
| WO | 2017020552 A1 | 2/2017 |

OTHER PUBLICATIONS

English Translation The second office action issued in corresponding CN application No. 201710090718.8 dated Jul. 11, 2019.
Extended European search report issued in corresponding European application No. 17896337.7 dated Jan. 20, 2020.
Hyunduk Kang (ETRI) et al: "A coexistence decision algorithm for GCOs operating over overlapped service coverage area"; dated Nov. 8, 2016; pp. 1-7, XP068111245.
Hyunduk Kang (ETRI) et al: "A coexistence discovery algorithm for GCOs under inaccurate geo-location information"; dated Nov. 8, 2016; pp. 1-9, XP068111239.
International search report issued in corresponding international application No. PCT/CN2017/103173 dated Jan. 3, 2018.
First examination report issued in corresponding IN application No. 201917031858 dated Feb. 8, 2021.

* cited by examiner

METHOD FOR WI-FI CONNECTION AND RELATED PRODUCTS

CROSS-REFERENCE TO RELATED APPLICATION(S)

This application is a continuation of International Application No. PCT/CN2017/103173, filed on Sep. 25, 2017, which claims priority to Chinese Patent Application No. 201710090718.8, filed on Feb. 20, 2017, the content of both of which are incorporated by reference herein in their entireties.

TECHNICAL FIELD

The present disclosure relates to the technical field of communications, and particularly to a method for wireless fidelity (Wi-Fi®) connection and related products.

BACKGROUND

With the rapid development of information technologies, terminals such as mobile phones and tablet computers become increasingly popular. User requirements on the terminals also become increasingly high. There is not only a need for a relatively high processing speed, but also an increasing dependence on Wi-Fi. With popularization of the terminals and Wi-Fi, it is frequent to connect the terminals to a Wi-Fi network.

In the present technology, one or more access points (APs) may be selected to be hidden in response to user operation to improve security of the APs.

SUMMARY

Implementations of the present disclosure provide a method for Wi-Fi connection and related products.

According to a first aspect of the present disclosure, a method for Wi-Fi connection is provided. The method includes the following.

Wi-Fi scan is performed to obtain information of K APs, where K is a positive integer. Match the information of the K APs with information of P first APs in a first Wi-Fi list pre-stored, where the first Wi-Fi list contains the P first APs and Q second APs each marked as a hidden AP, and P and Q are both positive integers. The Q second APs are determined as candidate APs for roaming in response to a match between the information of the K APs and the information of the P first APs.

According to a second aspect of the present disclosure, a terminal is provided. The terminal includes at least one processor and a computer readable memory, coupled to the at least one processor and storing at least one computer executable instruction therein, which when executed by the at least one processor, causes the at least one processor to perform the following. Wi-Fi scan is performed to obtain information of K APs, where K is a positive integer. Match the information of the K APs with information of P first APs in a first Wi-Fi list pre-stored, where the first Wi-Fi list contains the P first APs and Q second APs each marked as a hidden AP, and P and Q are both positive integers. The Q second APs are determined as candidate APs for roaming in response to a match between the information of the K APs and the information of the P first APs.

According to a third aspect of the present disclosure, a terminal is provided. The terminal includes at least one processor and a computer readable memory, coupled to the at least one processor and storing at least one computer executable instruction therein, which when executed by the at least one processor, causes the at least one processor to perform the following. Wi-Fi scan is performed to obtain information of at least one unhidden AP. A target Wi-Fi list is determined from multiple Wi-Fi lists pre-stored in the terminal, where the target Wi-Fi list contains at least one first AP and at least one second AP each marked as a hidden AP. In response to a match between the information of the at least one unhidden AP and the information of the at least one first AP, each of the at least one second AP is determined as a candidate AP for roaming.

BRIEF DESCRIPTION OF THE DRAWINGS

To illustrate technical solutions in implementations of the present disclosure more clearly, the following briefly introduces the accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

In the related art, during the process of Wi-Fi scan, the following may occur. Taking an AP to which a terminal was not connected as an example, before the AP is hidden, the terminal may roam to the AP when performing Wi-Fi scan, and then the AP is displayed on a screen of the terminal. However, after the AP is hidden, the terminal cannot roam to the AP. As a result, a problem that the terminal cannot roam to and be connected to a hidden AP needs to be solved instantly. Therefore, a method for Wi-Fi connection and related products are provided in implementations of the present disclosure for providing a solution for the problem that the terminal cannot roam to and be connected to a hidden AP.

Technical solutions of the present disclosure will be illustrated clearly and completely below through implementations with reference to the accompanying drawings. Apparently, the illustrated implementations are merely part of rather than all implementations of the present disclosure. All other implementations obtained by those of ordinary skill in the art based on the implementations of the present disclosure without creative efforts shall fall within the protection scope of the present disclosure.

The terms "first", "second", "third", "fourth", and the like used in the specification, the claims, and the accompany drawings of the present disclosure are used to distinguish different objects rather than illustrate a particular order. Further, the terms "include", "comprise", and "have" as well as variations thereof are intended to cover non-exclusive inclusion. For example, a process, a method, a system, a product, or an apparatus including a series of steps or units is not limited to listed steps or units. On the contrary, other steps or units that are not listed can be optionally included. Alternatively, other steps or units inherent to these processed, methods, products, or apparatuses can be included either.

"Implementation" mentioned herein means that specific characteristics, structures, or properties illustrated in connection with implementations may be included in at least one implementation of the disclosure. This word displayed at each position in the specification does not necessarily refer to the same implementation as well as an independent or alternate implementation mutually exclusive to other implementations. It may be explicitly and implicitly understood by those skilled in the art that implementations illustrated in the disclosure may be combined with the other implementations.

A terminal illustrated in implementations of the present disclosure may include a smart phone such as an Android® phone, an iPhone®, and a Windows® phone, a tablet, a palmtop, a laptop, a mobile internet device (MID), a wearable device, or the like, which is not exhausted but only listed as examples. The terminal includes, but is not limited to, the listed terminals.

It should be noted that, in implementations of the present disclosure, information of an AP may include, but is not limited to, a service set identifier (SSID), a basic service set identifier (BSSID), an encryption scheme, and geographic position information of the AP. After performing Wi-Fi scan, generally, information of at least one AP can be obtained by the terminal. In addition, a first Wi-Fi list in the implementations of the present disclosure is a list contained in historical data of Wi-Fi connection. The historical data of Wi-Fi connection may contain multiple Wi-Fi lists. Each Wi-Fi list may contain information of a unhidden AP(s) and b hidden AP(s), where a is an integer larger than or equal to 1, and b is a natural number. The terminal may find the unhidden APs via normal Wi-Fi scan, and find the hidden APs via specified SSID scan, where through the normal Wi-Fi scan, hidden APs cannot be found. Further, in each Wi-Fi list, a geographic position of current Wi-Fi environment may also be recorded.

According to an implementation of the present disclosure, a method for Wi-Fi connection is provided. The method includes the following. Wi-Fi scan is performed to obtain information of K APs, where K is a positive integer. Match the information of the K APs with information of P first APs in a first Wi-Fi list pre-stored, where the first Wi-Fi list contains the P first APs and Q second APs each marked as a hidden AP, and P and Q are both positive integers. The Q second APs are determined as candidate APs for roaming in response to a match between the information of the K APs and the information of the P first APs.

In the implementation, match the information of the K APs with the information of the P first APs as follows. From the P first APs, A APs corresponding to the information of the K APs are determined, where A is a natural number. In response to that a ratio of A to P exceeds a preset threshold, it is determined that the match between the information of the K APs and the information of the P first APs exists.

In the implementation, the method further includes the following. In response to a mismatch between the information of the K APs and the information of the P first APs, specified service set identifier (SSID) scan is performed according to X SSIDs pre-specified, X being a positive integer.

In the implementation, the method further includes the following. In response to that Y APs are scanned, a second Wi-Fi list is generated according to the information of the K APs and information of the Y APs, where each of the Y APs is marked as a hidden AP in the second Wi-Fi list, and Y is an integer smaller than or equal to X. The second Wi-Fi list is stored as historical records of Wi-Fi connection, where the historical records of Wi-Fi connection at least contains the first Wi-Fi list and the second Wi-Fi list.

In the implementation, the method further includes the following. A current position of a terminal is determined. According to the current position, the Wi-Fi list is obtained from historical records of Wi-Fi connection, where the historical records of Wi-Fi connection contains at least one Wi-Fi list each associated with position information of the terminal.

In the implementation, the method further includes the following. The current position of the mobile terminal is determined via Wi-Fi positioning technologies.

In the implementation, the method further includes the following. The Wi-Fi scan is performed in response to that a roaming condition is satisfied.

In the implementation, the method further includes the following. The Wi-Fi scan is performed in response to receipt of a beacon frame.

In the implementation, the method further includes the following. The Wi-Fi scan is performed in response to activation of a Wi-Fi module.

According to another implementation of the present disclosure, a terminal is provided. The terminal includes at least one processor and a computer readable memory, coupled to the at least one processor and storing at least one computer executable instruction therein, which when executed by the at least one processor, causes the at least one processor to perform the following. Wi-Fi scan is performed to obtain information of K APs, where K is a positive integer. Match the information of the K APs with information of P first APs in a first Wi-Fi list pre-stored, where the first Wi-Fi list contains the P first APs and Q second APs each marked as a hidden AP, and P and Q are both positive integers. The Q second APs are determined as candidate APs for roaming in response to a match between the information of the K APs and the information of the P first APs.

According to yet another implementation of the present disclosure, a terminal is provided. The terminal includes at least one processor and a computer readable memory, coupled to the at least one processor and storing at least one computer executable instruction therein, which when executed by the at least one processor, causes the at least one processor to perform the following. Wi-Fi scan is performed to obtain information of at least one unhidden AP. A target Wi-Fi list is determined from multiple Wi-Fi lists pre-stored in the terminal, where the target Wi-Fi list contains at least one first AP and at least one second AP each marked as a hidden AP. In response to a match between the information of the at least one unhidden AP and the information of the at least one first AP, each of the at least one second AP is determined as a candidate AP for roaming.

Figure 1:
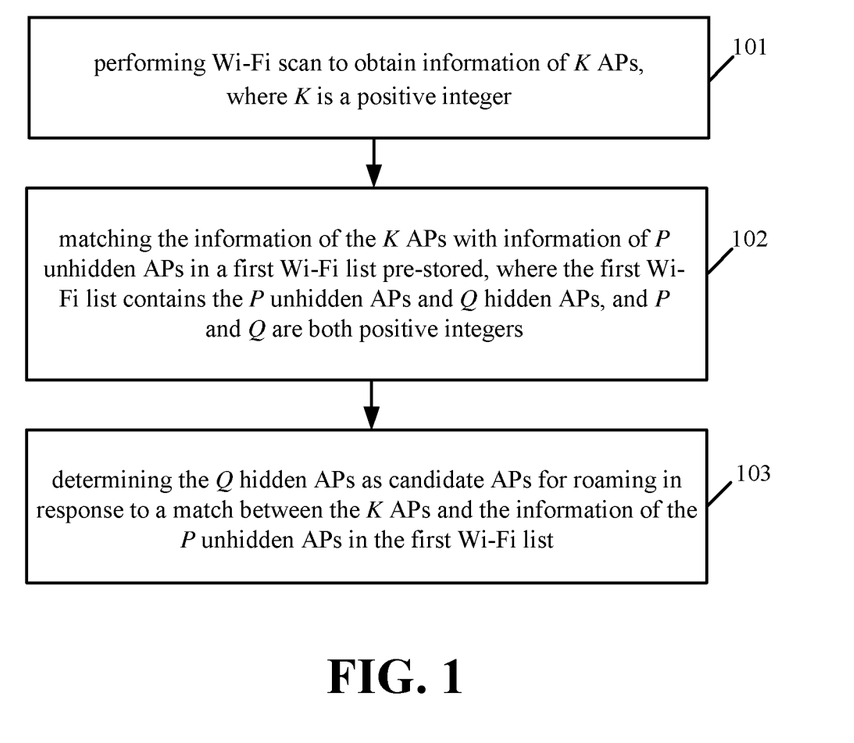
FIG. 1 is a flow chart illustrating a method for Wi-Fi connection according to a first implementation of the present disclosure.

FIG. 1 is a flow chart illustrating a method for Wi-Fi connection according to a first implementation of the present disclosure. The method for Wi-Fi connection illustrated in the first implementation begins at block 101.

At block 101, Wi-Fi scan is performed to obtain information of K APs, where K is a positive integer.

A terminal may perform the Wi-Fi scan, and thus the K AP may be scanned and the information of the K APs may be obtained, where K is a positive integer.

In an implementation, at block 101, the Wi-Fi scan may be performed when a roaming condition is satisfied.

In an implementation, at block 101, the Wi-Fi scan may be performed when a beacon frame is received.

In an implementation, at block 101, the Wi-Fi scan may be performed when a Wi-Fi module is enabled.

The terminal may perform the Wi-Fi scan after the Wi-Fi module is enabled. The Wi-Fi scan may be triggered when the terminal meets the roaming condition. The terminal can perform the Wi-Fi scan upon receipt of the beacon frame broadcast by an AP. The terminal can obtain the information of the K APs after the Wi-Fi scan.

At block 102, the terminal matches the information of the K APs with information of P first APs (i.e., P unhidden APs) in a first Wi-Fi list pre-stored, where the first Wi-Fi list contains the P unhidden APs and Q second APs each marked as a hidden AP (i.e., Q hidden APs), and P and Q are both positive integers.

The terminal can perform operations at block 103 in response to a match between the information of the K APs and the information of the P unhidden APs in the first Wi-Fi list pre-stored.

In an implementation, specified SSID scan is performed according to X SSIDs pre-specified in response to a mismatch between the information of the K APs and the information of the P unhidden APs in the first Wi-Fi list, where X is a positive integer.

When the information of the K APs fails to match with the information of the P unhidden APs in the first Wi-Fi list, it indicates that the current Wi-Fi environment is different from that associated with the first Wi-Fi list. Therefore, the terminal can perform the specified SSID scan according to the X SSIDs pre-specified, where X is a positive integer. The X SSIDs can be set by users.

In an implementation, at block 102, the terminal matches the information of the K APs with the information of the P unhidden APs in the first Wi-Fi list pre-stored as follows.

21) A APs corresponding to the information of the K APs are determined from the P unhidden APs in the first Wi-Fi list, where A is a natural number.

22) It is determined that the information of the K APs matches with the information of the P unhidden APs in the first Wi-Fi list when a ratio of A to P exceeds a preset threshold.

The preset threshold may be system default or may be set by users.

For example, the operations at 21 can be performed as follows. The terminal matches BSSIDs of the K APs with BSSIDs of the P unhidden APs. It is assumed that in the P unhidden APs there are A APs each having the same BSSID as one of the K APs, and then the ratio of A to P is determined. When the ratio exceeds the preset threshold, it can be determined that the information of the K APs matches with the information of the P unhidden APs in the first Wi-Fi list.

For another example, the operations at 21 can be performed as follows. The terminal matches SSIDs of the K APs with SSIDs of the P unhidden APs. It is assumed that in the P unhidden APs there are A APs each having the same SSID as one of the K APs, and then the ratio of A to P is determined. When the ratio exceeds the preset threshold, it can be determined that the information of the K APs matches with the information of the P unhidden APs in the first Wi-Fi list.

For yet another example, the operations at 21 can be performed as follows. The terminal matches the BSSIDs of the K APs with the BSSIDs of the P unhidden APs and matches signal strength values of the K APs with signal strength values of the P unhidden APs to obtain A APs, where each of the A APs has the same BSSID as one of the K APs and one of the P unhidden APs, and a signal strength difference between the signal strength value of the one of the K APs and a signal strength value of the one of the P unhidden APs is lower than a threshold. Further, the ratio of A to P can be determined. When the ratio exceeds the preset threshold, it can be determined that the information of the K APs matches with the information of the P unhidden APs in the first Wi-Fi list.

At block 103, the Q hidden APs are determined as candidate APs for roaming in response to the match between the information of the K APs and the information of the P unhidden APs in the first Wi-Fi list.

When the information of the K APs matches with the information of the P unhidden APs in the first Wi-Fi list, it can be considered that the terminal locates in a place where the terminal was moved. Therefore, the Q hidden APs can be determined as the candidate APs for roaming. In this case, the hidden APs can be considered as the candidate APs for roaming. Furthermore, one hidden AP can be selected for connection. In this way, more connectable APs are provided for selection, thereby improving efficiency of Wi-Fi connection.

In the implementations of the present disclosure, when the terminal meets the roaming condition, a roaming scan can be triggered. After the roaming scan, the specified SSID scan can be performed, where the specified SSIDs are generally hidden SSIDs known to a user in advance. Check if there are hidden hotspots around the terminal. BSSIDs and signal strength values obtained via the normal scan are recorded in a list N. If the specified SSID scan returns a result, a BSSID returned can be recorded in the list N and marked as a hidden BSSID. If multiple BSSIDs are returned, then the multiple BSSIDs are all recorded in the list N. If no result is returned, it is recorded that there is no hidden BSSID in this environment. When the roaming scan is triggered once more, match the BSSIDs and the signal strength values in the list obtained via the current roaming scan with the BSSIDs and the signal strength values recorded in the list N last time, respectively. If the number of the BSSIDs obtained via the current roaming scan equals that of the BSSIDs recorded in the list N last time and a difference between corresponding signal strength values is lower than 5 dB, it can be considered as a successful match, and the BSSIDs and the signal strength values are recorded in a list U. If a ratio of the number of records in the list U to the number of records in the list N exceeds 80%, it indicates that Wi-Fi environment associated with the list U and Wi-Fi environment associated with the list N are the same; if not, it indicates that the two Wi-Fi environments are different. If the Wi-Fi environments are the same, check if there are hidden APs in the list N; if yes, add the hidden APs into the list recording the candidate APs for roaming; if not, it indicates that there is no hidden AP in this environment, and the specified SSID scan is not performed. If the Wi-Fi environments are different, the specified SSID scan is triggered. In this way, the terminal can roam to a hidden hotspot.

It can be seen that, in the implementations of the present disclosure, the Wi-Fi scan is performed to obtain the information of the K APs, where K is a positive integer. Match the information of the K APs with the information of P unhidden APs in the first Wi-Fi list pre-stored, where the first Wi-Fi list contains the P unhidden APs and the Q hidden APs, and P and Q are both positive integers. When the information of the K APs matches with the information of the P unhidden APs in the first Wi-Fi list, the Q hidden APs are determined as the candidate APs for roaming. In this way, the hidden APs can be scanned and determined as the candidate APs for roaming, and thus the terminal can roam to and be connected to a hidden AP, thereby improving efficiency of Wi-Fi connection.

Figure 2:
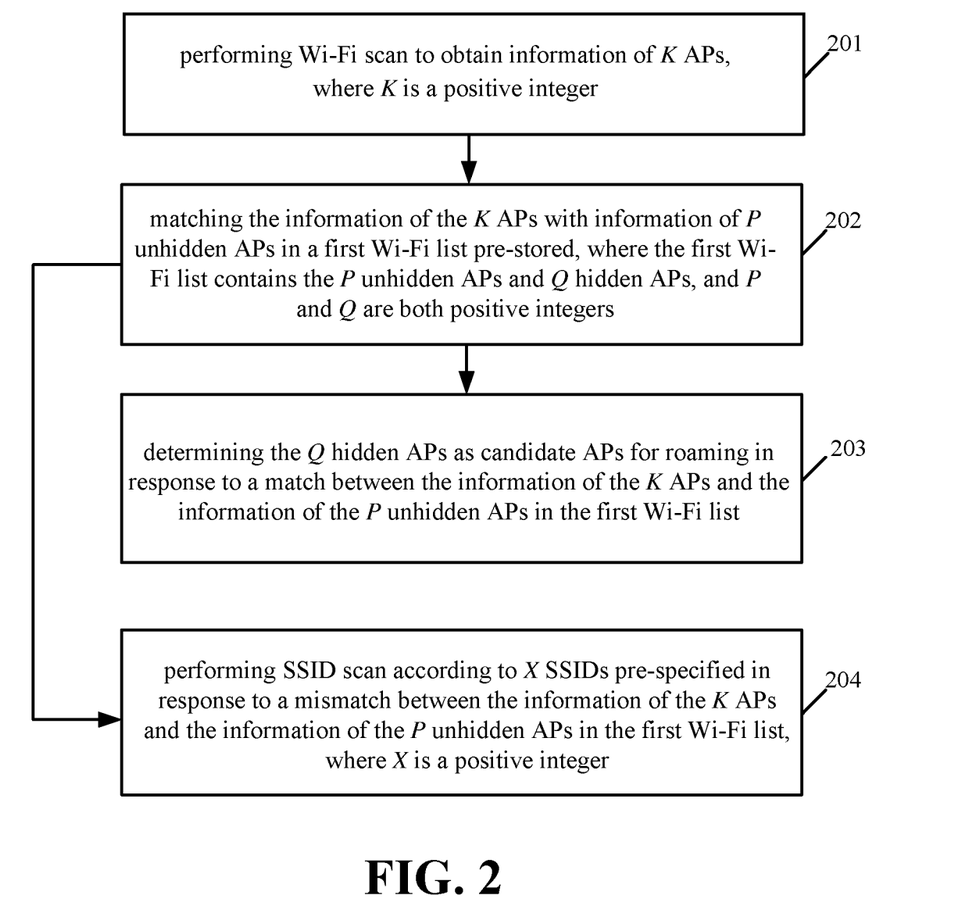
FIG. 2 is a flow chart illustrating a method for Wi-Fi connection according to a second implementation of the present disclosure.

In consistence with the above, FIG. 2 is a flow chart illustrating a method for Wi-Fi connection according to a second implementation of the present disclosure. The method for Wi-Fi connection illustrated in the second implementation begins at block 201.

At block 201, Wi-Fi scan is performed to obtain information of K APs, where K is a positive integer.

At block 202, match the information of the K APs with information of P fist APs (i.e., P unhidden APs) in a first Wi-Fi list pre-stored, where the first Wi-Fi list contains the P unhidden APs and Q second APs each marked as a hidden AP (i.e., Q hidden APs), and P and Q are both positive integers.

At block 203, the Q hidden APs are determined as candidate APs for roaming in response to a match between the information of the K APs and the information of the P unhidden APs in the first Wi-Fi list.

For detailed description of the operations at blocks 201 to 203, reference can be made to the operations at blocks 101 to 103 of the method for Wi-Fi connection as illustrated in FIG. 1, and details are not repeated herein.

At block 204, specified SSID scan is performed according to X SSIDs pre-specified in response to a mismatch between the information of the K APs and the information of the P unhidden APs in the first Wi-Fi list, where X is a positive integer.

When the information of the K APs fails to match with the information of the P unhidden APs in the first Wi-Fi list, it indicates that current Wi-Fi environment is different from Wi-Fi environment associated with the first Wi-Fi list. Therefore, the terminal can perform the specified SSID scan according to the X SSIDs pre-specified, where X is a positive integer. The X SSIDs can be set by users.

In an implementation, after the specified SSID scan is performed according to the X SSIDs pre-specified at block 204, the following can be performed.

When Y APs are scanned, a second Wi-Fi list is generated according to the information of the K APs and information of the Y APs, where Y is an integer smaller than or equal to X.

After the specified SSID scan, APs corresponding to part of the X SSIDs may be scanned. Assume that the Y APs are scanned, the second Wi-Fi list can be generated according to the information of the K APs and the information of the Y APs. Each of the Y APs is marked as a hidden AP in the second Wi-Fi list. The second Wi-Fi list is further stored as historical records of Wi-Fi connection. The historical records of Wi-Fi connection at least contains the first Wi-Fi list and the second Wi-Fi list, that is, the first Wi-Fi list is determined from the historical records of Wi-Fi connection.

It can be seen that, in the implementations of the present disclosure, the Wi-Fi scan is performed to obtain the information of K APs, where K is a positive integer. Match the information of the K APs with the information of the P unhidden APs in the first Wi-Fi list pre-stored, where the first Wi-Fi list contains the P unhidden APs and the Q hidden APs, and P and Q are both positive integers. In response to the match between the information of the K APs and the information of the P unhidden APs in the first Wi-Fi list, the Q hidden APs are determined as candidate APs for roaming. In response to the mismatch between the information of the K APs and the information of the P unhidden APs in the first Wi-Fi list, the specified SSID scan can be performed. In this way, hidden APs can be scanned and determined as the candidates APs for roaming, and thus the terminal can roam to and be connected to one hidden AP, thereby improving efficiency of Wi-Fi connection.

Figure 3:
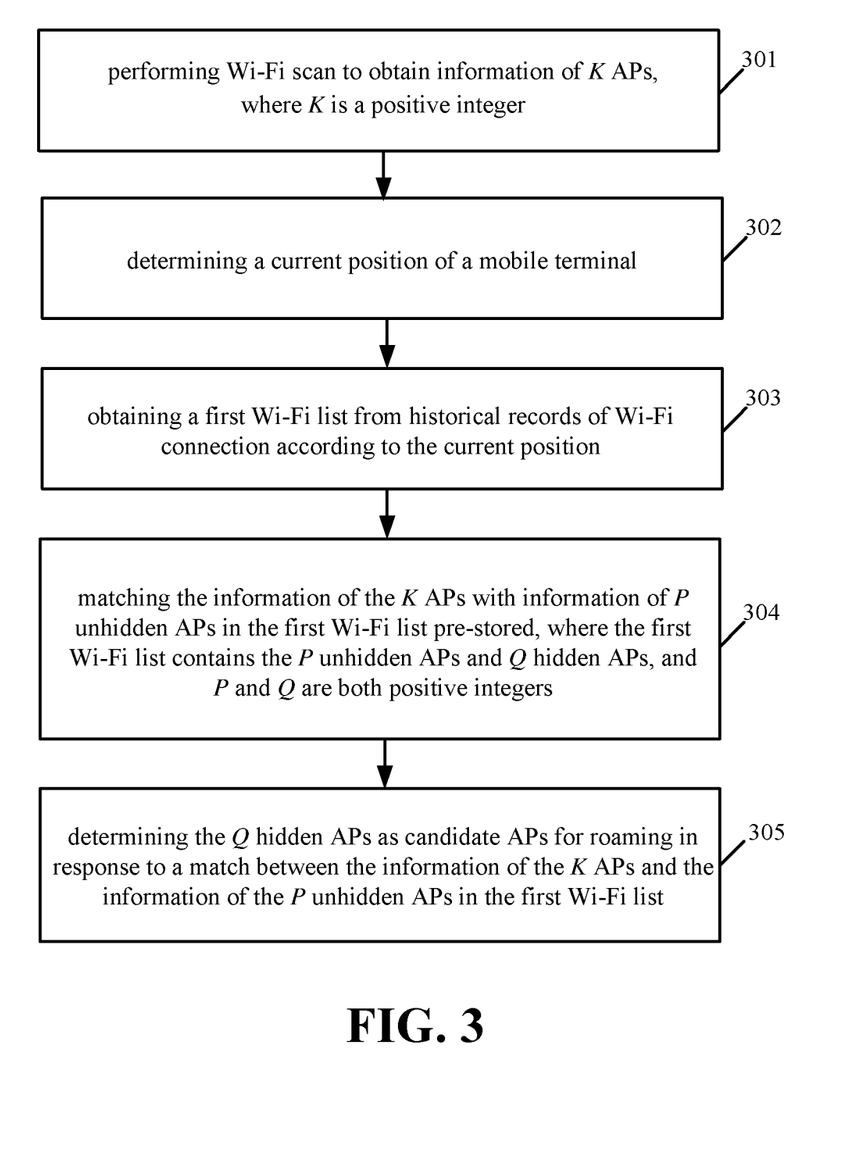
FIG. 3 is a flow chart illustrating a method for Wi-Fi connection according to a third implementation of the present disclosure.

In consistence with the above, FIG. 3 is a flow chart illustrating a method for Wi-Fi connection according to a third implementation of the present disclosure. The method for Wi-Fi connection illustrated in the third implementation begins at block 301.

At block 301, Wi-Fi scan is performed to obtain information of K APs, where K is a positive integer.

At block 302, a current position of a terminal is determined.

The terminal can determine its current position via a global positioning system (GPS). Alternatively, the terminal can determine its current position via Wi-Fi positioning technologies. The current position of the terminal can be represented in the form of longitude and latitude. For example, the current position can be represented as 113°46' east longitude and 22°27' north latitude. If the current position of the terminal is determined via the Wi-Fi positioning technologies, a position of an AP scanned by the current Wi-Fi scan can be taken as the position of the terminal. The position of the AP may be marked as a point in an indoor map, where the point indicates the position of the terminal.

At block 303, a first Wi-Fi list is obtained from historical records of Wi-Fi connection according to the current position.

For example, the historical records of Wi-Fi connection contains multiple Wi-Fi lists, and each Wi-Fi list corresponds to a position, that is, each Wi-Fi list is associated with position information of the terminal. Therefore, the first Wi-Fi list can be obtained from the historical records of Wi-Fi connection according to the current position of the terminal.

At block 304, match the information of the K APs with information of P first APs (i.e., P unhidden APs) in a first Wi-Fi list, where the first Wi-Fi list contains the P unhidden APs and Q second APs each marked as a hidden AP (i.e., Q hidden APs), and P and Q are both positive integers.

At block 305, the Q hidden APs are determined as candidate APs for roaming in response to a match between the information of the K APs and the information of the P unhidden APs in the first Wi-Fi list.

For details of the operations at blocks 301, 304, and 305, reference can be made to corresponding operations at blocks 101 to 103 of the method for Wi-Fi connection as illustrated in FIG. 1, and details are not repeated herein.

It can be seen that, in the implementations of the present disclosure, the Wi-Fi scan is performed to obtain the information of the K APs, where K is a positive integer. The current position of the terminal is obtained. The first Wi-Fi list corresponding to the current position is obtained from historical data of Wi-Fi connection. Match the information of the K APs with information of the P unhidden APs in the first Wi-Fi list, where the first Wi-Fi list contains the P unhidden APs and the Q hidden APs, and P and Q are both positive integers. In response to the match between the information of the K APs and the information of the P unhidden APs in the first Wi-Fi list, the Q hidden APs are determined as the candidate APs for roaming. In this way, the hidden APs can be scanned and determined as candidates APs for roaming, and thus the terminal can roam to and be connected to one hidden AP, thereby improving efficiency of Wi-Fi connection.

In consistence with the above, an apparatus configured to implement the method for Wi-Fi connection is provided.

Figure 4:
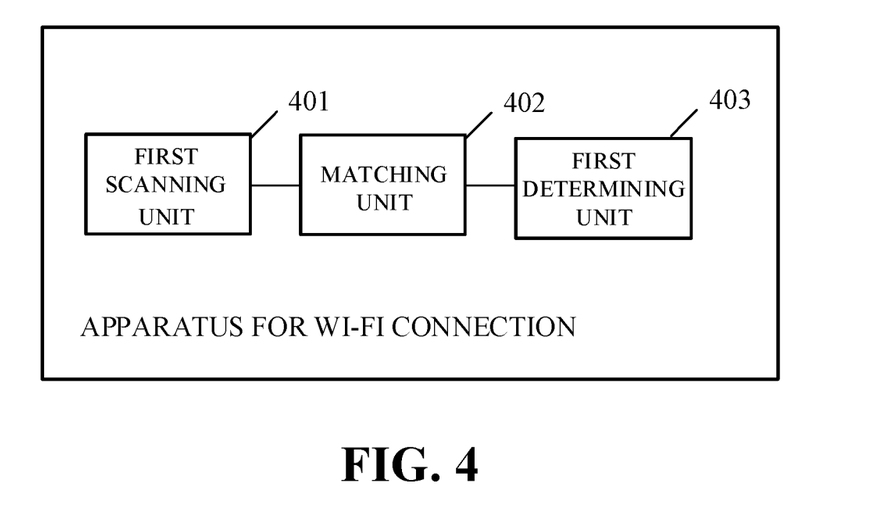
FIG. 4 is a block diagram illustrating an apparatus for Wi-Fi connection according to an implementation of the present disclosure.

Referring to FIG. 4, FIG. 4 is a block diagram illustrating an apparatus for Wi-Fi connection according to an implementation of the present disclosure. The apparatus for Wi-Fi connection illustrated in the implementation includes a first scanning unit 401, a matching unit 402, and a first determining unit 403.

The first scanning unit 401 is configured to perform Wi-Fi scan to obtain information of K APs, where K is a positive integer.

The matching unit 402 is configured to match the information of the K APs with information of P first APs (i.e., P unhidden APs) in a first Wi-Fi list pre-stored, where the first Wi-Fi list contains the P unhidden APs and Q second APs each marked as a hidden AP (i.e., Q hidden APs), and P and Q are both positive integers.

The first determining unit 403 is configured to determine the Q hidden APs as candidate APs for roaming, when a matching result from the matching unit 402 is a match between the information of the K APs and the information of the P unhidden APs in the first Wi-Fi list.

In an implementation, the first scanning unit 401 configured to perform the Wi-Fi scan is configured to perform the Wi-Fi scan when a roaming condition is satisfied.

In an implementation, the first scanning unit 401 configured to perform the Wi-Fi scan is configured to perform the Wi-Fi scan when a beacon frame is received.

In an implementation, the first scanning unit 401 configured to perform the Wi-Fi scan is configured to perform the Wi-Fi scan when a Wi-Fi module is enabled.

Figure 5:
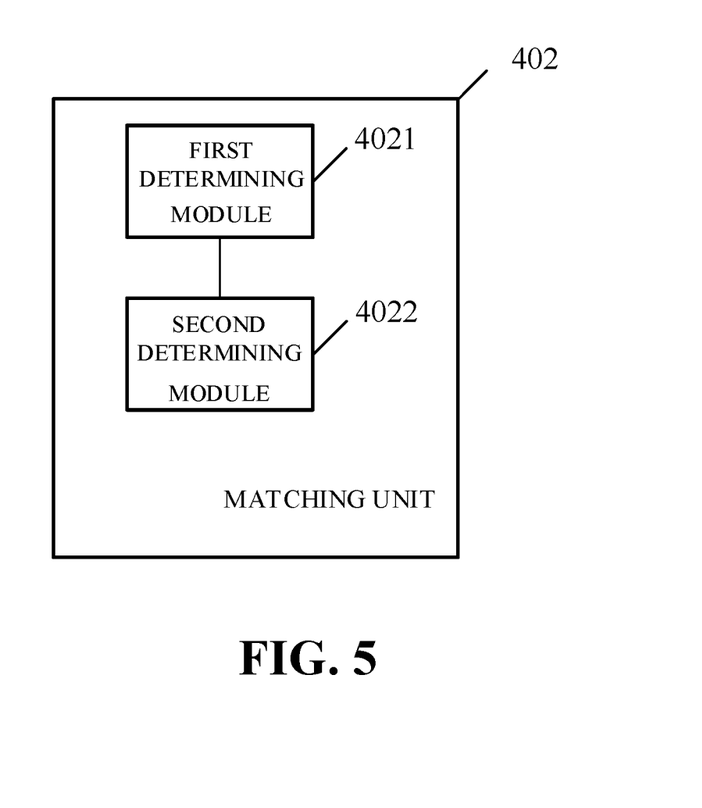
FIG. 5 is a block diagram illustrating a matching unit of the apparatus for Wi-Fi connection illustrated in FIG. 4 according to an implementation of the present disclosure.

In an implementation, a detailed structure of the matching unit 402 of the apparatus for Wi-Fi connection illustrated in FIG. 4 is illustrated in FIG. 5. As illustrated in FIG. 5, the matching unit 402 includes a first determining module 4021 and a second determining module 4022.

The first determining module 4021 is configured to determine, from the P unhidden APs in the first Wi-Fi list, A APs corresponding to the information of the K APs, where A is a natural number.

The second determining module 4022 is configured to determine that the information of the K APs matches with the information of the P unhidden APs in the first Wi-Fi list when a ratio of A to P exceeds a preset threshold.

Figure 6:
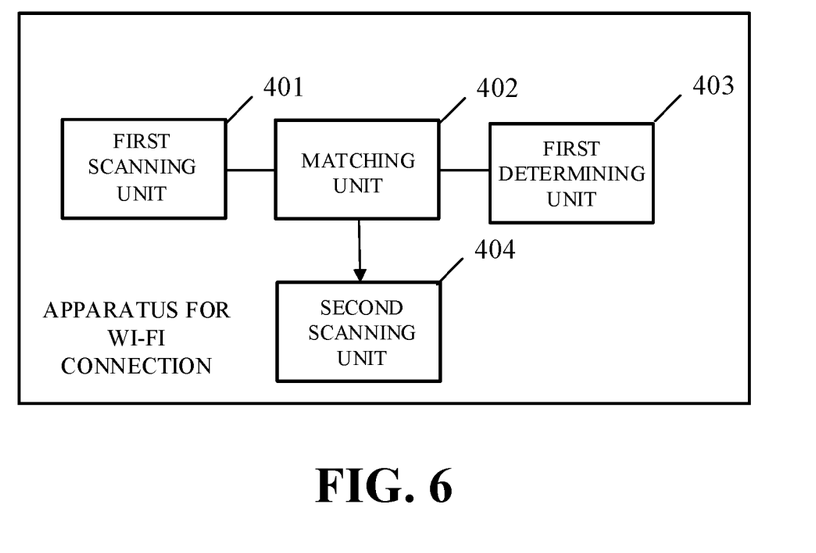
FIG. 6 is a block diagram illustrating an apparatus for Wi-Fi connection according to another implementation of the present disclosure.

In an implementation, another modified structure of the apparatus for Wi-Fi connection illustrated in FIG. 4 is illustrated in FIG. 6. Compared with FIG. 4, the apparatus for Wi-Fi connection illustrated in FIG. 6 further includes a second scanning unit 404.

The second scanning unit 404 is configured to perform specified SSID scan according to X SSIDs pre-specified when the matching result from the matching unit 402 is a mismatch between the information of the K APs and the information of the P unhidden APs in the first Wi-Fi list, where X is a positive integer.

Figure 7:
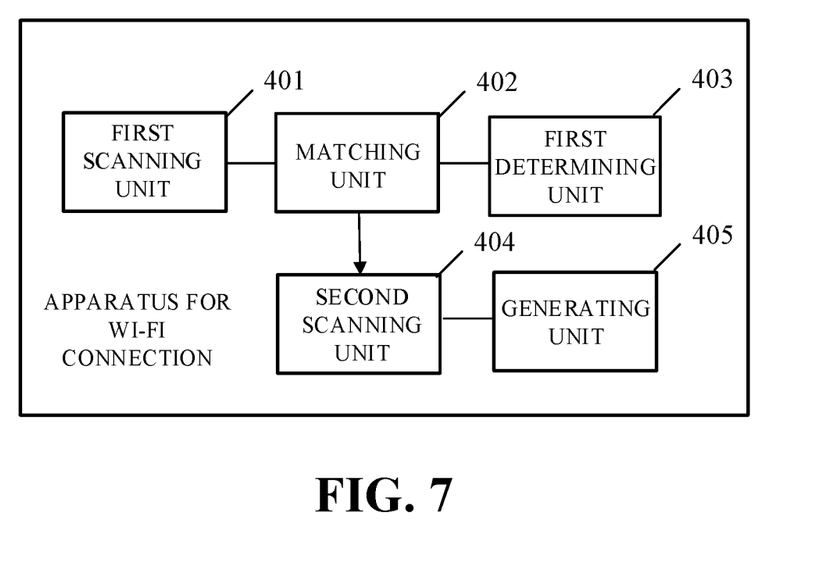
FIG. 7 is a block diagram illustrating an apparatus for Wi-Fi connection according to another implementation of the present disclosure.

In an implementation, another modified structure of the apparatus for Wi-Fi connection illustrated in FIG. 4 is illustrated in FIG. 7. Compared with FIG. 4, the apparatus for Wi-Fi connection illustrated in FIG. 7 further includes a generating unit 405.

The generating unit 405 is configured to generate, in response to that Y APs are scanned, a second Wi-Fi list according to the information of the K APs and information of the Y APs, after the second scanning unit 404 performs the specified SSID scan according to the X SSIDs pre-specified, where Y is an integer smaller than or equal to X.

Figure 8:
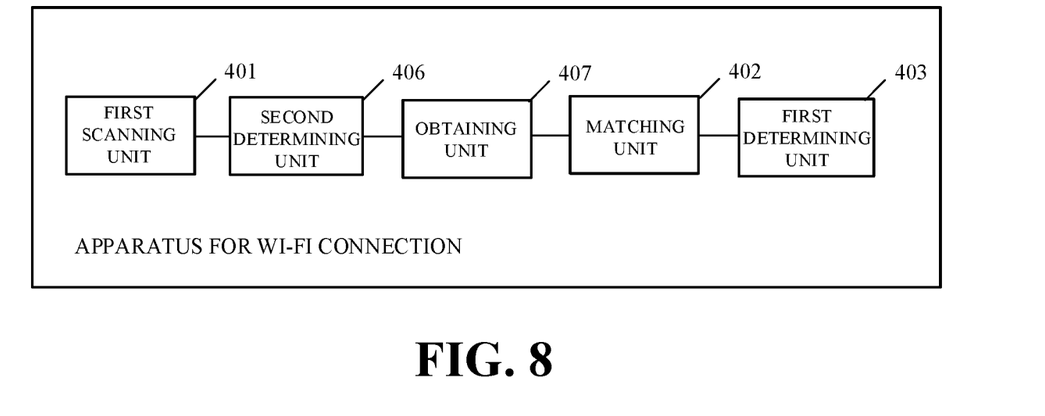
FIG. 8 is a block diagram illustrating an apparatus for Wi-Fi connection according to yet another implementation of the present disclosure.

In an implementation, another modified structure of the apparatus for Wi-Fi connection illustrated in FIG. 4 is illustrated in FIG. 8. Compared with FIG. 4, the apparatus for Wi-Fi connection illustrated in FIG. 8 further includes a second determining unit 406 and an obtaining unit 407.

The second determining unit 406 is configured to determine a current position of a terminal after the first scanning unit 401 performs the Wi-Fi scan to obtain the information of the K APs.

The obtaining unit 407 is configured to obtain the first Wi-Fi list from historical records of Wi-Fi connection according to the current position of the terminal. The matching unit 402 is configured to match the information of the K APs with the information of the P unhidden APs in the first Wi-Fi list pre-stored.

In an implementation, the second determining unit 406 configured to determine the current position of the terminal is configured to determine the current position of the terminal via a GPS or Wi-Fi positioning technologies.

It can be seen that, by means of the apparatus for Wi-Fi connection illustrated in the implementations of the present disclosure, the Wi-Fi scan is performed to obtain the information of the K APs, where K is a positive integer. Match the information of the K APs with the information of the P unhidden APs in the first Wi-Fi list, where the first Wi-Fi list contains the P unhidden APs and the Q hidden APs, and P and Q are both positive integers. In response to the match between the information of the K APs and the information of the P unhidden APs in the first Wi-Fi list, the apparatus determines the Q hidden APs as the candidate APs for roaming. In this way, the hidden APs can be scanned and determined as the candidates APs for roaming, and thus the terminal can roam to and be connected to one hidden AP, thereby improving efficiency of Wi-Fi connection.

It should be noted that the apparatus for Wi-Fi connection illustrated in the implementations of the present disclosure is presented in the form of functional units. The term "unit" mentioned herein should be understood as the broadest possible meaning, and an object for implementing the functions described for each "unit" may be, for example, an integrated circuit such as an application specific integrated circuit (ASIC), a single circuit, or a processor (shared, dedicated or chipset) for executing one or more software or firmware programs and a memory, a combinatorial logic circuit, and/or other components suitable for executing functions described above.

Figure 9:
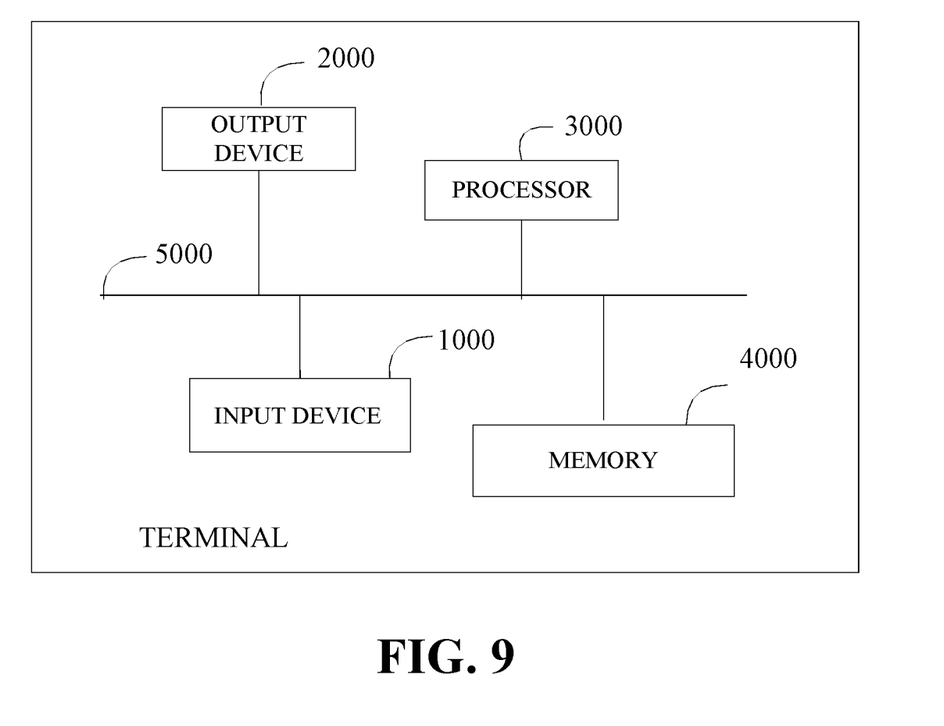
FIG. 9 is a block diagram illustrating a terminal according to an implementation of the present disclosure.

For example, the first scanning unit 401 configured to perform Wi-Fi scan can be implemented by a terminal illustrated in FIG. 9. In an implementation, the Wi-Fi scan can be executed by a processor 3000 through invoking executable program code stored in a memory 4000.

In consistence with the above, FIG. 9 is a block diagram illustrating a terminal according to an implementation of the present disclosure. The terminal includes at least one input device 1000, at least one output device 2000, at least one processor 3000 such as a central processing unit (CPU), and a memory 4000. The input device 1000, the output device 2000, the processor 3000, and the memory 4000 are coupled with each other through a bus 5000.

The input device 1000 may be a touch screen, a physical key, or a mouse.

The output device 2000 may be a display screen.

The memory 4000 may be a high speed random access memory (RAM), and may be a non-volatile memory such as a disk storage. The memory 4000 is configured to store a set of program codes. The input device 1000, the output device 2000, and the processor 3000 are configured to invoke the program codes stored in the memory 4000 to perform the following.

The processor 3000 is configured to perform Wi-Fi scan to obtain information of K APs, where K is a positive integer. The processor 3000 is further configured to match the information of the K APs with information of P first APs (i.e., P unhidden APs) in a first Wi-Fi list pre-stored, where the first Wi-Fi list contains the P unhidden APs and Q second APs each marked as a hidden AP (i.e., Q hidden AP), and P and Q are both positive integers. The processor 3000 is further configured to determine the Q hidden APs as candidate APs for roaming in response to a match between the information of the K APs and the information of the P unhidden APs in the first Wi-Fi list.

In an implementation, the processor 3000 is configured to match the information of the K APs with the information of the P unhidden APs in the first Wi-Fi list as follows.

The processor 3000 is configured to determine, from the P unhidden APs in the first Wi-Fi list, A APs corresponding to the information of the K APs, and to determine that the information of the K APs matches with the information of the P unhidden APs in the first Wi-Fi list when a ratio of A to P exceeds a preset threshold, where A is a natural number.

In an implementation, the processor 3000 is further configured to perform specified SSID scan according to X SSIDs pre-specified in response to a mismatch between the information of the K APs and the information of the P unhidden APs in the first Wi-Fi list, where X is a positive integer.

In an implementation, after performing the specified SSID scan according to the X SSIDs pre-specified, the processor 3000 is further configured to generate, in response to that Y APs are scanned, a second Wi-Fi list according to the information of the K APs and information of the Y APs, where each of the Y APs is marked as a hidden AP in the second Wi-Fi list, and Y is an integer smaller than or equal to X. The second Wi-Fi list is stored as historical records of Wi-Fi connection, and the historical records of Wi-Fi connection at least contains the first Wi-Fi list and the second Wi-Fi list.

In an implementation, after performing the Wi-Fi scan to obtain the information of the K APs and before matching the information of the K APs with the information of the P unhidden APs in the first Wi-Fi list pre-stored, the processor 3000 is further configured to determine a current position of a terminal, to obtain the first Wi-Fi list from historical records of Wi-Fi connection according to the current position, and to match the information of the K APs with the information of the P unhidden APs in the first Wi-Fi list pre-stored.

In an implementation, the processor 3000 configured to determine the current position of the terminal is configured to determine the current position of the terminal via a GPS or Wi-Fi positioning technologies.

In an implementation, the processor 3000 configured to perform the Wi-Fi scan is configured to perform the Wi-Fi scan when a roaming condition is satisfied.

In an implementation, the processor 3000 configured to perform the Wi-Fi scan is configured to perform the Wi-Fi scan when a beacon frame is received.

In an implementation, the processor 3000 configured to perform the Wi-Fi scan is configured to perform the Wi-Fi scan when a Wi-Fi module is enabled.

The implementations of the present disclosure also provide a computer storage medium. The computer readable storage medium is configured to store computer programs, where the computer programs are operable to execute some of or all operations of the method for Wi-Fi connection described in any one of method implementations of the present disclosure.

The implementations of the present disclosure also provide a computer program product. The computer program product includes a non-transitory computer-readable storage medium that stores computer programs, where the computer programs are operable with a computer to execute some of or all operations of the method for Wi-Fi connection described in any one of method implementations of the present disclosure.

Although the disclosure has been described in conjunction with various implementations herein, however, other variations to the enclosed implementations can be understood and obtained by those skilled in the art from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

Those skilled in the art should understand that the implementations of the disclosure may be provided as a method, an apparatus (equipment), or a computer program product. Therefore, the present disclosure may use a form of hardware only implementations, software only implementations, or implementations with a combination of software and hardware. Moreover, the present disclosure may use a form of a computer program product that is implemented on one or more computer-usable storage medium (including but not limited to a disk memory, a CD-ROM, an optical memory, and the like) that include computer-usable program codes. The computer program is stored/distributed in proper medium and is provided as or used as a part of the hardware together with another hardware, or may also use another distribution form, such as by using the Internet or another wired or wireless telecommunication system.

The disclosure is described in connection with flowcharts and/or block diagrams of the method, apparatus (equipment), and computer program product according to the implementations of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor, or a processor of other programmable data processing equipment to generate a machine, so that an apparatus for realizing a function specified in one flow or more flows in the flowcharts and/or one block or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing device, so that a series of operations are executed on the computer or the other programmable data processing device to generate processing implemented by the computer, and operations for realizing the function specified in one flow or many flows in the flowcharts and/or one block or many blocks in the block diagrams are provided by the instructions executed on the computer or the other programmable data processing device.

Although the disclosure is described in connection with specific characteristics and the implementations, obviously, various modifications and combinations may be made to the disclosure without departing from the spirit and scope of the disclosure. Correspondingly, the specification and the drawings are only exemplary descriptions about the disclosure defined by the appended claims, and are considered to cover any and all modifications, variations, combinations or equivalents in the scope of the disclosure. Obviously, those skilled in the art may make various modifications and variations to the disclosure without departing from the spirit and scope of the disclosure. Therefore, if these modifications and variations of the disclosure belong to the scope of the claims of the disclosure and equivalent technologies thereof, the disclosure is also intended to include these modifications and variations.

What is claimed is:

1. A method for wireless fidelity (Wi-Fi) connection, comprising:
   performing Wi-Fi scan to obtain information of K access points (APs), K being a positive integer;
   matching the information of the K APs with information of P first APs in a first Wi-Fi list pre-stored, the first Wi-Fi list containing the P first APs and Q second APs each marked as a hidden AP, and P and Q both being positive integers; and
   determining, in response to a match between the information of the K APs and the information of the P first APs, the Q second APs as candidate APs for roaming.

2. The method of claim 1, wherein matching the information of the K APs with the information of the P first APs comprises:
   determining, from the P first APs, A APs corresponding to the information of the K APs, A being a natural number; and
   determining, in response to that a ratio of A to P exceeds a preset threshold, that the match between the information of the K APs and the information of the P first APs exists.

3. The method of claim 1, further comprising:
   performing, in response to a mismatch between the information of the K APs and the information of the P first APs, specified service set identifier (SSID) scan according to X SSIDs pre-specified, X being a positive integer.

4. The method of claim 3, further comprising:
   generating, in response to that Y APs are scanned, a second Wi-Fi list according to the information of the K APs and information of the Y APs, each of the Y APs being marked as a hidden AP in the second Wi-Fi list, and Y being an integer smaller than or equal to X; and
   storing the second Wi-Fi list as historical records of Wi-Fi connection, the historical records of Wi-Fi connection at least containing the first Wi-Fi list and the second Wi-Fi list.

5. The method of claim 1, further comprising:
   determining a current position of a terminal; and
   obtaining, from historical records of Wi-Fi connection, the Wi-Fi list according to the current position, the historical records of Wi-Fi connection containing at least one Wi-Fi list each associated with position information of the terminal.

6. The method of claim 5, further comprising:
   determining the current position of the terminal via Wi-Fi positioning technologies.

7. The method of claim 1, further comprising:
   performing the Wi-Fi scan in response to that a roaming condition is satisfied.

8. The method of claim 1, further comprising:
   performing the Wi-Fi scan in response to receipt of a beacon frame.

9. The method of claim 1, further comprising:
   performing the Wi-Fi scan in response to activation of a Wi-Fi module.

10. A terminal comprising:
    at least one processor; and
    a computer readable memory, coupled to the at least one processor and storing at least one computer executable instruction therein, which when executed by the at least one processor, causes the at least one processor to carry out actions, comprising:
       performing Wi-Fi scan to obtain information of K access points (APs), K being a positive integer;
       matching the information of the K APs with information of P first APs in a first Wi-Fi list pre-stored, the first Wi-Fi list containing the P first APs and Q second APs each marked as a hidden AP, and P and Q both being positive integers; and
       determining, in response to a match between the information of the K APs and the information of the P first APs, the Q hidden APs as candidate APs for roaming.

11. The terminal of claim 10, wherein the at least one processor carrying out the action of matching the information of the K APs with the information of the P first APs is caused to carry out actions, comprising:
    determining, from the P first APs, A APs corresponding to the information of the K APs, A being a natural number; and
    determining, in response to that a ratio of A to P exceeds a preset threshold, that the match between the information of the K APs and the information of the P first APs exists.

12. The terminal of claim 10, wherein the at least one computer executable instruction further causes the at least one processor to carry out an action, comprising:

performing, in response to a mismatch between the information of the K APs and the information of the P first APs, specified service set identifier (SSID) scan according to X SSIDs pre-specified, X being a positive integer.

13. The terminal of claim 12, wherein the at least one computer executable instruction further causes the at least one processor to carry out actions, comprising:
generating, in response to that Y APs are scanned, a second Wi-Fi list according to the information of the K APs and information of the Y APs, each of Y APs being marked as a hidden AP in the second Wi-Fi list, and Y being an integer smaller than or equal to X; and
storing the second Wi-Fi list as historical records of Wi-Fi connection, the historical records of Wi-Fi connection at least containing the first Wi-Fi list and the second Wi-Fi list.

14. The terminal of claim 10, wherein the at least one computer executable instruction further causes the at least one processor to carry out actions, comprising:
determining a current position of the terminal; and
obtaining, from historical records of Wi-Fi connection, the Wi-Fi list according to the current position, the historical records of Wi-Fi connection comprising at least one Wi-Fi list each associated with position information of the terminal.

15. The terminal of claim 14, wherein the at least one processor carrying out the action of determining the current position of the terminal is caused to carry out an action, comprising:
determining the current position of the terminal via Wi-Fi positioning technologies.

16. The terminal of claim 10, wherein the at least one processor carrying out the action of performing the Wi-Fi scan is caused to carry out an action, comprising:
performing the Wi-Fi scan in response to that a roaming condition is satisfied.

17. The terminal of claim 10, wherein the at least one processor carrying out the action of performing the Wi-Fi scan is caused to carry out an action, comprising:
performing the Wi-Fi scan in response to receipt of a beacon frame.

18. The terminal of claim 10, wherein the at least one processor carrying out the action of performing the Wi-Fi scan is caused to carry out an action, comprising:
performing the Wi-Fi scan in response to activation of a Wi-Fi module.

19. A terminal comprising:
at least one processor; and
a computer readable memory, coupled to the at least one processor and storing at least one computer executable instruction therein, which when executed by the at least one processor, causes the at least one processor to carry out actions, comprising:
performing Wi-Fi scan to obtain information of at least one unhidden access point (AP);
determining a target Wi-Fi list from at least one Wi-Fi list pre-stored in the terminal, the target Wi-Fi list containing at least one first AP and at least one second AP each marked as a hidden AP; and
determining, in response to a match between the information of the at least one unhidden AP and the information of the at least one first AP, each of the at least one second AP as a candidate AP for roaming.

20. The terminal of claim 19, wherein the at least one computer executable instruction further causes the at least one processor to carry out an action, comprising:
performing, in response to a mismatch between the information of the at least one unhidden AP and the information of the at least one first AP, specified service set identifier (SSID) scan according to at least one SSID pre-specified.

* * * * *